United States Patent [19]
Hansen et al.

[11] 3,710,682
[45] Jan. 16, 1973

[54] ARMORED EJECTION SEAT

[75] Inventors: John V. E. Hansen, Westboro; Eldon W. Hauck, Worcester, both of Mass.

[73] Assignee: Norton Company, Worcester, Mass.

[22] Filed: July 24, 1969

[21] Appl. No.: 844,671

[52] U.S. Cl. ................................................244/122
[51] Int. Cl. ..............................B64d 7/00, F41h 7/00
[58] Field of Search....89/36 R, 36 A, 36 Z; 161/404; 244/121, 122 R, 122 A, 122 AB, 122 AC, 122 AD, 122 AE, 122 AF, 122 AG, 122 AH, 122 B

[56] References Cited

UNITED STATES PATENTS

| | | | |
|---|---|---|---|
| 2,702,677 | 2/1955 | Replogle | 244/122 AB |
| 3,130,947 | 4/1964 | Franks | 244/122 AC |
| 3,222,015 | 12/1965 | Larsen et al. | 244/122 AB X |
| 3,516,898 | 6/1970 | Cook | 89/36 A UX |
| 3,581,620 | 6/1971 | Hauck et al. | 244/122 R |

FOREIGN PATENTS OR APPLICATIONS 1,009,977   6/1957   Germany..............................89/36 P

OTHER PUBLICATIONS

"Ceramic–Armor Seat Built for Huey Cobra," Aviation Week & Space Technology, Dec. 4, 1967, p. 119.

*Primary Examiner*—Stephen C. Bentley
*Attorney*—Cushman, Darby & Cushman, Allan R. Redrow and Rufus M. Franklin

[57] ABSTRACT

An armored ejection seat structure for aircraft or the like includes a unitary seat and back constructed of a fiber glass resin layer having refractory plates bonded thereto. The structure carries an ejection rocket motor attached to the rear of the seat back by means of a connection which spreads the load imposed during ejection so as to prevent failure of the armor material.

5 Claims, 3 Drawing Figures

PATENTED JAN 16 1973
3,710,682
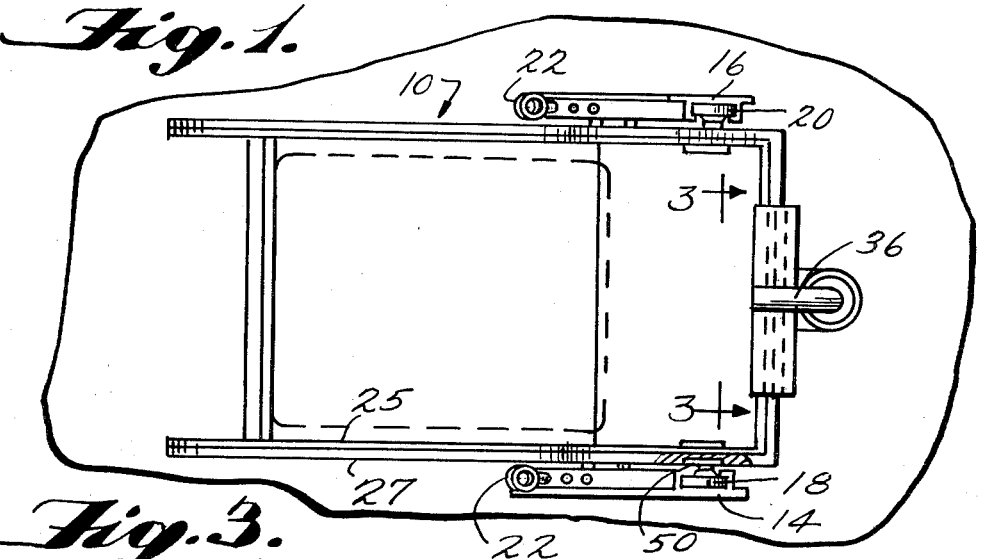
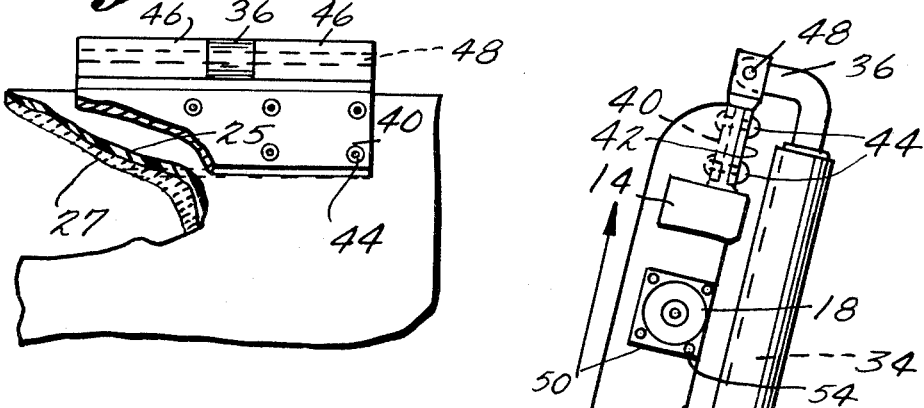
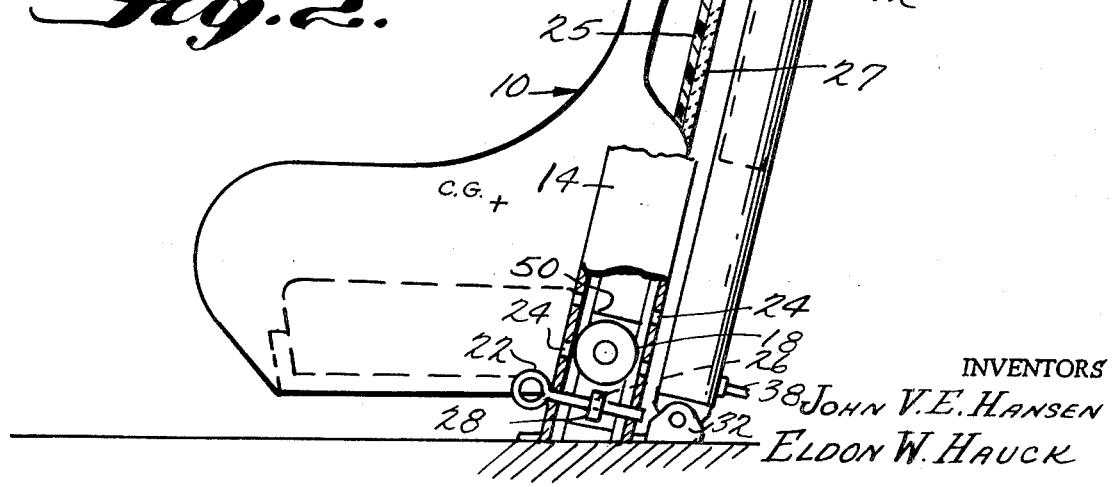
INVENTORS
JOHN V. E. HANSEN
ELDON W. HAUCK
BY Cushman, Darby & Cushman
ATTORNEYS

ARMORED EJECTION SEAT

RELATED APPLICATIONS

This invention provides an armored seat for the pilot of an aircraft that may be ejected to allow the pilot to parachute to earth while being protected by the armor structure. The basic seat of this disclosure is known and used in current military aircraft.

A disclosure of the means for producing a type of ceramic plate that can be used with a fiber glass layer to form an armor structure for use in this invention, is disclosed in the U. S. application of R. A. Alliegro, Ser. No. 475,940, filed July 30, 1965, now U.S. Pat. No. 3,440,312 for Automatic Hot Pressing of Plates.

BACKGROUND AND SUMMARY OF THE INVENTION

This invention relates to seat structures for use in military aircraft or the like and in particular to an armored ejection seat constructed of composite laminated armor material and including an ejection mechanism connected to the seat structure.

In an aircraft ejection seat the ejection mechanism, usually a rocket motor, is fixed to the seat, and the force required to eject the seat must be transmitted to and borne by the seat itself. Usually the rocket motor is carried on the rear face of the seat back. Typically, an ejection seat has been made in the past of a metal skin, such as aluminum, attached to the launching rack for the ejection mechanism, it being realized that the metal skin is relatively light weight and capable of withstanding the high shear and tensile forces exerted on the seat back during ejection. In practice, such ejection seats have not been armor plated, because to do so would add such extra weight that ejection would not be practical. Nor can armor usually be disposed on the aircraft adjacent the rest, due to lack of space.

It has now been found, however, that an armored ejection seat of sufficiently light weight and sufficiently high strength can be constructed of a laminate of resin-bonded fiber glass and dense refractory plates, despite the natural reluctance one would have to using a refractory or ceramic material in an environment where high shear and tensile forces occur. Accordingly, the present invention provides armor protection for an ejection seat and in addition it provides the ejected person with armor protection during a parachute descent. Further, the seat may be used after descent as a portable shield against small arms fire.

With respect to the composite material itself, it is known that in recent years a highly useful armor plate has been created making use of relatively thin high density plates fabricated from refractory materials such as alumina, silicon carbide, boron carbide and the like. Composite fiber glass and refractory structures formed of these materials can be fabricated for mounting in vests for the protection of combat personnel and such structures have also been used for armor when positioned in strategic locations on military vehicles for protecting the vital parts of the machines and the personnel disposed behind the armor.

The refractory plates used for the composite armor structure may be fabricated by following the hot pressing technique disclosed in the above-mentioned application. These plates are relatively thin and are more or less heavy depending upon the material from which the plate is made. Such plates when fabricated into the laminated fiber glass structure have the ability of stopping the bullets fired from the usual combat weapons used by infantry personnel, for example .50 caliber armor piercing projectiles.

Boron carbide plates have been found to be particularly useful for lamination with a fiber glass bonded sheet to form an armor adapted for use in aircraft because for a given size and thickness of plate, this composite structure has the same ability to stop projectiles as the other types of fiber glass and refractory plates, the boron carbide composite, however, being much lighter for any given armoring ability. The composite structure with boron carbide is currently being used on aircraft now in production and in personnel vests particularly for helicopter crewmen.

The present invention provides a particular adaptation of the above-described type of composite material by employing the composite material as the material of construction for an aircraft ejection seat structure in a manner to take full advantage of the tensile strength of the fiber glass and the compressive strength of the refractory plates both during normal use of the seat and during ejection. The seat structure includes mounting means cooperating with upwardly extending guide rails, which may be conventional, the latter being fixed to the aircraft and the mounting means being adapted to permit the seat structure to move off the guide rails when the ejection mechanism operates. The connection between the seat and the ejection mechanism is constructed so as to distribute the force applied by the ejection mechanism widely over the surface of the fiber glass layer of the seat to preclude delamination or other damage thereto during ejection. The connection between the seat and the mounting means is constructed so as to distribute the forces generated during flying.

The invention will be further understood from the following detailed description of an illustrative embodiment taken with the drawing in which, FIG. 1 is a plan view of an armored ejection seat embodying the principles of the present invention;

FIG. 2 is a side elevational view, partly broken away; and

FIG. 3 is an enlarged view looking in the direction of arrows 3—3 and showing the attachment of the ejection mechanism to the seat.

DETAILED DESCRIPTION

In FIGS. 1 and 2 there is shown an ejection seat structure including a seat 10 and an ejection mechanism 12, typically a rocket motor, for launching the seat 10 away from the aircraft. The seat 10 may have the typical bucket shape employed in aircraft, and there is provided a suitable support arrangement for supporting the seat on the aircraft while at the same time permitting the seat to be ejected upon activation of the ejection mechanism 12. In the embodiment illustrated the support arrangement includes two spaced-apart upwardly extending, channel-shaped, rail members 14 and 16 fixed at their lower ends to the aircraft and supporting the seat 10 between them by means of rollers 18 and 20, the latter being carried on the sides of the seat 10 at vertically spaced-apart positions. Ordinarily, the seat 10 is adjustable to the pilot's comfort up and down the rails 14 and 16 by some suitable arrangement. As shown, there is provided a pin 22 associated with each rail and adapted to pass through any of a series of aligned apertures 24 and 26 in the rail and in a bracket 28, the latter being fixed to the seat 10.

The seat is constructed of composite armor material consisting of an innerlayer 25 formed of molded fiber glass resin bonded material and an outer refractory layer 27 composed of individual refractory tiles. Techniques for molding a fiber glass reinforced structure to produce relatively lightweight fabricated shapes having relatively high tensile strength are well known. For the purpose of the present invention, the fiber glass layer 25 preferably takes the form of a bucket seat shape having a front side and a back side with a relatively high back support portion adapted to engage and support the pilot's entire back, and extending upwardly to provide protection around the space occupied by his head. The overall shape of the entire seat structure is designed to rather completely enclose the pilot's body from his knees to the top of his head.

The back side of the fiber glass form 25 is adapted to have the refractory tiles fixed thereto to form an integral laminated armored seat structure. By molding techniques known in the art refractory tiles can be fabricated having a relatively thin cross-section, and of a size such as 4 × 4 inches, and up to a size of the order of about 24 × 30 inches. By making use of this molding technique, a pattern of individual tiles can be fabricated that can be adhesively secured to the back side of the seat, to form a complete layer 27 of refractory tiles to provide a composite structure effective to stop bullets up to about .50 caliber.

The ejection mechanism 12 may be of conventional construction, and as shown, it is of the rocket catapult type including an outer tube 30 having an open upper end and connected at its lower end by means of a bracket 32 to the frame or chassis of the aircraft. A rocket motor 34 is telescopically and slidably received within the upper end of the tube 30 and is connected at its upper end to the back of the seat 10 by an assembly which includes a yoke 36. Firing of the rocket motor 34, under the control of the occupant, is effected in any suitable manner as by means of a connection 38 which may initiate the rocket fuel through electrical, mechanical or pneumatic means. When the occupant decides to eject, he removes the pins 22 which hold the seat 10 in position relative to the rails 14 and 16 and activates the circuit to fire the rocket motor 34, whereupon the motor 34 moves upwardly out of the tube 30 and carries the seat 10 upwardly off the rails 14 and 16. It is evident that in a more sophisticated system the pins 22 can be automatically disconnected or sheared to release the seat 10 when the rocket is fired. In any event, the force of the rocket motor, when fired, is transmitted to the yoke 36 and by the yoke 36 to the seat 10. When ejection is thus effected, great stress is placed upon that portion of the seat to which the yoke 36 is attached. To prevent failure at this point, the attachment is reinforced by the provision of metal pads 40 and 42 which serve to spread the loads imposed.

The pads 40 and 42 which desirably may be constructed of high strength aluminum are mounted one on each side of the seat laminate, front and back, and a plurality of holes may be drilled through the assembly and rivets 44 may be positioned in these holes and utilized to draw or clamp the pads 40 and 42 together whereby the loads may be distributed most effectively. Each pad 40 and 42 includes an integral cylindrical element 46, which with the cylindrical element 46 of the other pad straddle the yoke 36. The cylindrical elements 46 and the yoke 36 are centrally apertured, whereby when they are aligned, a square pin 48 may be inserted to serve as the principal element in transmitting force from the yoke 36 to the seat 10. Since the pin 48 is coextensive with the two elements 46, the lifting force of the yoke 36 is applied to substantially the entire upper edges of the pads 40 and 42.

Referring again to the mounting of the seat 10 on the rails 14 and 16, it will be appreciated that forces generated by the weight of the occupant are transmitted through the connection between the seat 10 and each of the rails at the locations of the rollers 18, 20. As shown, each of these connections includes a pair of plates 50 and 52 disposed on opposite sides of and clamped to the fiber glass layer 25 by rivets 54 or other fastening means. The outer plate 50 carries the respective roller 16 or 18, and the adjacent refractory tiles which make up the refractory layer 27 are arranged to fit snugly against the four edges of the plate 50. The brackets 28 for the pins 22 are fixed to the lowermost plate 50. Both the plate 50 and the plate 52 have relatively large surface areas in engagement with the fiber glass layer 25 so as to distribute loading forces widely over the surface of the fiber glass member to preclude delamination when the seat 10 is subjected to unduly heavy loads.

In one embodiment of the invention, in order to secure maximum advantage of the lightness of boron carbide for protection against a .50 caliber armor piercing projectile, it is suggested that refractory tiles be fabricated having thickness of about 0.5 to 0.6 inch. A pattern of individual tiles may be provided that can be integrally adhered to the back side of the basic fiber glass seat structure with the adjoining edges of all the individual tiles in an abutting tightly fitted relationship. The tiles may be assembled on the fiber glass layer with any suitable adhesive, one of the polysulfide types of resins serving well for this purpose. It is suggested that epoxy and polyurethane resins may also be used.

In utilizing this invention, relatively lightweight boron carbide tiles are provided having a density in the range of from 2.3 up to the theoretical density of 2.51 grams per cubic centimeter, with a compressive strength in the order of 400,000 pounds per square inch. Boron carbide tile has been fabricated in thicknesses of from 0.25 inch to upwards of 0.60 inch for use on fiber glass forms to provide conventional armored plates such as are now used in combat.

Armored seats in accordance with the present invention have been made in which the fiber glass layer of the bucket seat was ¼ inch thick and a boron carbide layer ⅜ inch was integrally bonded to the back side of the fiber glass layer with polysulfide adhesive (Proseal). Such an armored structure exhibited the ability to stop a caliber .30 APM2 bullet having a velocity of 2600 feet per second. The boron carbide layer was produced by making smaller refractory tile shapes in a pattern such that their sides can be tightly fitted together and will have abutting contact with all sides of each other. Such a seat has been tested by applying G loadings in all directions such as would be encountered under aircraft combat conditions and has been found to be entirely adequate to support an average pilot's weight, even though the actual seat supporting element of the seat is in effect a cantilever beam. The basic seat construction here described may be completed by the addition of side panels which may be bolted to suitable side frames on the bucket seat. Such panels are preferably a laminar fiber glass boron carbide armor material adapted to give the pilot additional side protection.

Referring to FIG. 2, when a pilot or ordinary weight occupies the seat, the center of gravity of his mass is normally positioned somewhat forwardly on the back portion and above the seat portion 28, as indicated by the + mark CG.

It is apparent that the bottom portion of the seat structure here disclosed constitutes a generally cantilever mounted support means and in the normal use of the seat, particularly in an aircraft, when coming out of dives, for example, a relatively high G load is imposed upon the bottom of the seat. The fiber glass structure along the seat bottom is thus subjected to loading which tends to bend it downwardly toward the floor of the vehicle, which stress imposes a tensile stress on the fiber glass layer 25. When the fiber glass begins to change its shape as this tensile stress builds up it tends to displace the refractory tile integrally adhered to the bottom side of the fiber glass layer. Due to the interaction of the fiber glass layer in tension and the rigid tile integral with the back side of the fiber glass, a compressive force is imposed on the refractory tile layer 27. Since the tile selected for attachment to the back side of the fiber glass layer 25 is of high compressive strength, it is apparent that the stress loads developed on the surface elements of the seat are completely contained by the interaction of the several parts as long as their load limits are not exceeded. The fiber glass layer is placed in tension and since it has excellent tensile strength, the seat portion remains intact so long as the fiber glass is not stretched beyond its elastic limit. Should the tensile stress develop to such an extent as to tend to distort the fiber glass, the stress is immediately transferred to the integrally bonded refractory tile layer. Under this change of circumstances, the compressive forces begin to build up in the tile at the same time and it is apparent that tremendous forces can be absorbed within the laminated structure here disclosed which permit the seat to be fully operative under all conditions to which the composite seat structure is normally subjected under flight conditions.

From the above description it will be appreciated that the ejection seat of the present invention overcomes the problem of providing an armored ejection seat which is sufficiently light in weight to be capable of effective launching. In addition, the seat will give protection during a parachute descent of the occupant under combat conditions while he remains in the seat and will provide a lightweight portable armor device giving protection to the person after landing in the event that he is still under fire.

What is claimed is:

1. In a military or other vehicle adapted to receive a powered pilot ejection seat, an armored seat means adapted to be supported on means to permit the seat to be projected generally upwardly from the floor of the vehicle structure, said seat means comprising a molded fiber glass resin member having front and back surfaces for supporting a person on its front side, said fiber glass member being constructed to have a high tensile strength, a relatively thin layer of refractory material integrally bonded to the back side of said member, said refractory layer having a high compressive strength characteristic to provide a laminate structure upon which substantial loads may be imposed, whereby a lightweight composite seat structure results, a propulsion unit for ejecting said seat means from the vehicle, and mounting means connecting said propulsion unit to said seat means, said mounting means including front and rear plates of substantial area clamping between them a portion of the seat back and connecting means fixed to said propulsion unit and fixed independently to each of said plates thereby distributing the force of said propulsion unit independently to said plates and over a relatively large area of said seat means so as to avoid damage thereto during ejection.

2. A structure as in claim 1, wherein the refractory layer is comprised of a number of interfitted blocks having an intimate contact with one another along all their adjoining sides.

3. A structure as in claim 2, wherein the blocks are made of a hot pressed boron carbide composition.

4. A structure as in claim 1 including guide means extending generally upwardly from the floor of the vehicle and further including mounting means for releasably mounting said seat means to the guide means, said mounting means including spaced apart engaging means cooperating with the guide means at relatively widely spaced locations, attaching plates fixedly supporting said seat means on said engaging means, said attaching plates engaging the fiber glass resin member to distribute loading forces widely over the surface of said fiber glass resin member to preclude delamination thereof when subjecting said seat means to unduly heavy loads.

5. A structure as in claim 1 wherein said front and rear plates are disposed at the upper end of the seat back and wherein said connecting means extends over the upper end of the seat back and is fixed to the upper edges of each of said plates.

* * * * *